United States Patent [19]
Iizuka et al.

[11] Patent Number: 5,881,061
[45] Date of Patent: Mar. 9, 1999

[54] METHOD AND SYSTEM FOR DATA COMMUNICATION

[75] Inventors: Masataka Iizuka; Hiroshi Yoshida; Hidetoshi Kayama, all of Yokohama, Japan

[73] Assignee: Nippon Telegraph and Telephone Corporation, Tokyo, Japan

[21] Appl. No.: 659,297

[22] Filed: Jun. 6, 1996

[30] Foreign Application Priority Data

Jun. 7, 1995 [JP] Japan ..................................... 7-140859

[51] Int. Cl.[6] ...................................................... H04J 00/00
[52] U.S. Cl. .......................... 370/337; 370/442; 370/468; 370/459
[58] Field of Search ..................................... 370/523, 522, 370/524, 528, 352, 353, 354, 355, 356, 465, 468, 433, 437, 321, 337, 347, 442, 458, 459

[56] References Cited

U.S. PATENT DOCUMENTS

| | | | |
|---|---|---|---|
| 4,245,340 | 1/1981 | Landry | 370/523 |
| 4,446,555 | 5/1984 | Devault et al. | 370/352 |
| 4,482,999 | 11/1984 | Janson et al. | 370/352 |
| 4,491,947 | 1/1985 | Frank | 370/352 |
| 4,611,321 | 9/1986 | Gabrielli et al. | 370/352 |
| 4,730,312 | 3/1988 | Johnson et al. | 370/523 |
| 4,761,781 | 8/1988 | Calvignac et al. | 370/352 |
| 5,093,827 | 3/1992 | Franklin et al. . | |
| 5,327,428 | 7/1994 | Van As et al. | 370/353 |
| 5,392,280 | 2/1995 | Zheng | 370/353 |

FOREIGN PATENT DOCUMENTS

| | | |
|---|---|---|
| 0 236 102 | 9/1987 | European Pat. Off. . |
| 0 281 010 A2 | 9/1988 | European Pat. Off. . |
| 1-248793 | 10/1989 | Japan . |
| 6-216838 | 8/1994 | Japan . |

OTHER PUBLICATIONS

Kayama et al, "A Study on Packet Channel Structure for Personal Handy–phone Systems", Institute of Electronics and Information Communication Engineering of Japan, Communication Society Meeting, p. 252, with English abstract, (1995).

Z. Zhang et al., "Bounds on the Mean System–Size and Delay for a Movable–Boundary Integrated Circuit and Packet Switched Communications Channel," *IEEE Transactions on Communications,* vol. 42, No. 1, Jan. 1994, pp. 90–99.

M. Bonuccelli et al., "Incremental Time–Slot Assignment in SS/TDMA Satellite Systems," *IEEE Transactions on Communications,* vol. 39, No. 7, Jul. 1991, pp. 1147–1156.

C. Rosenberg et al., "Management Procedures for Hybrid Multiplexing," *IEEE Global Telecomms. Conference,* Dec. 1992, pp. 938–942.

*Primary Examiner*—Huy D. Vu
*Attorney, Agent, or Firm*—Finnegan, Henderson, Farabow, Garrett & Dunner, L.L.P.

[57] ABSTRACT

A data communication method is provided by the present invention for carrying out a radio communication by intermingling circuit-switched communication and packet-switched communication using the TDMA communication mode between a radio base station and multiple radio terminals. An idle slot among slots for traffic channel is assigned for a generated circuit-switched data in order, and an idle slot among slots for control channel that belongs to a frame wherein a control signal is not transmitted for a generated packet-switched data, by this method. By assigning an idle slot among slots for control channel for packet-switched data, this method allows intermingling with the good efficiency of the circuit-switched communication and the packet-switched communication.

13 Claims, 7 Drawing Sheets

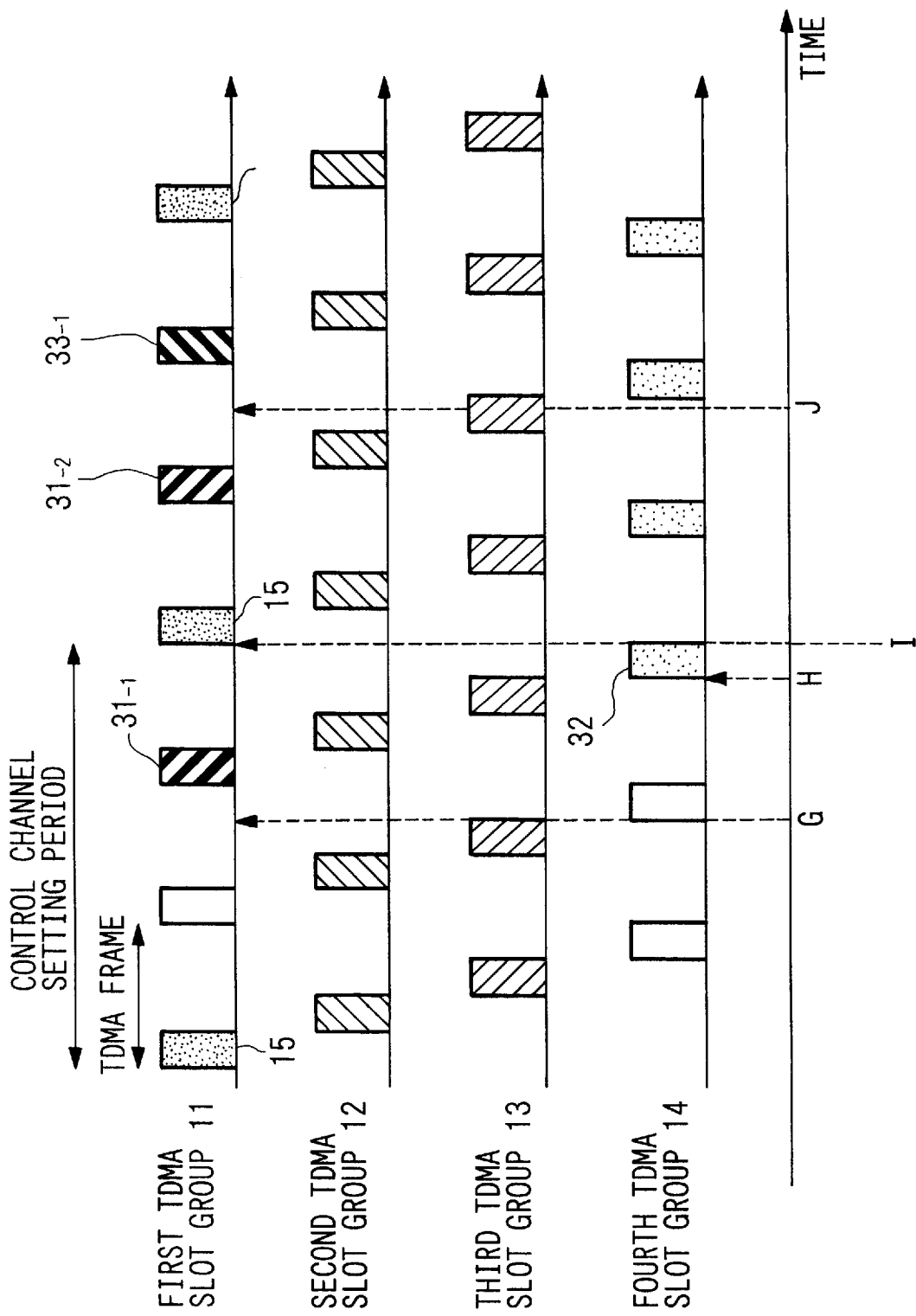

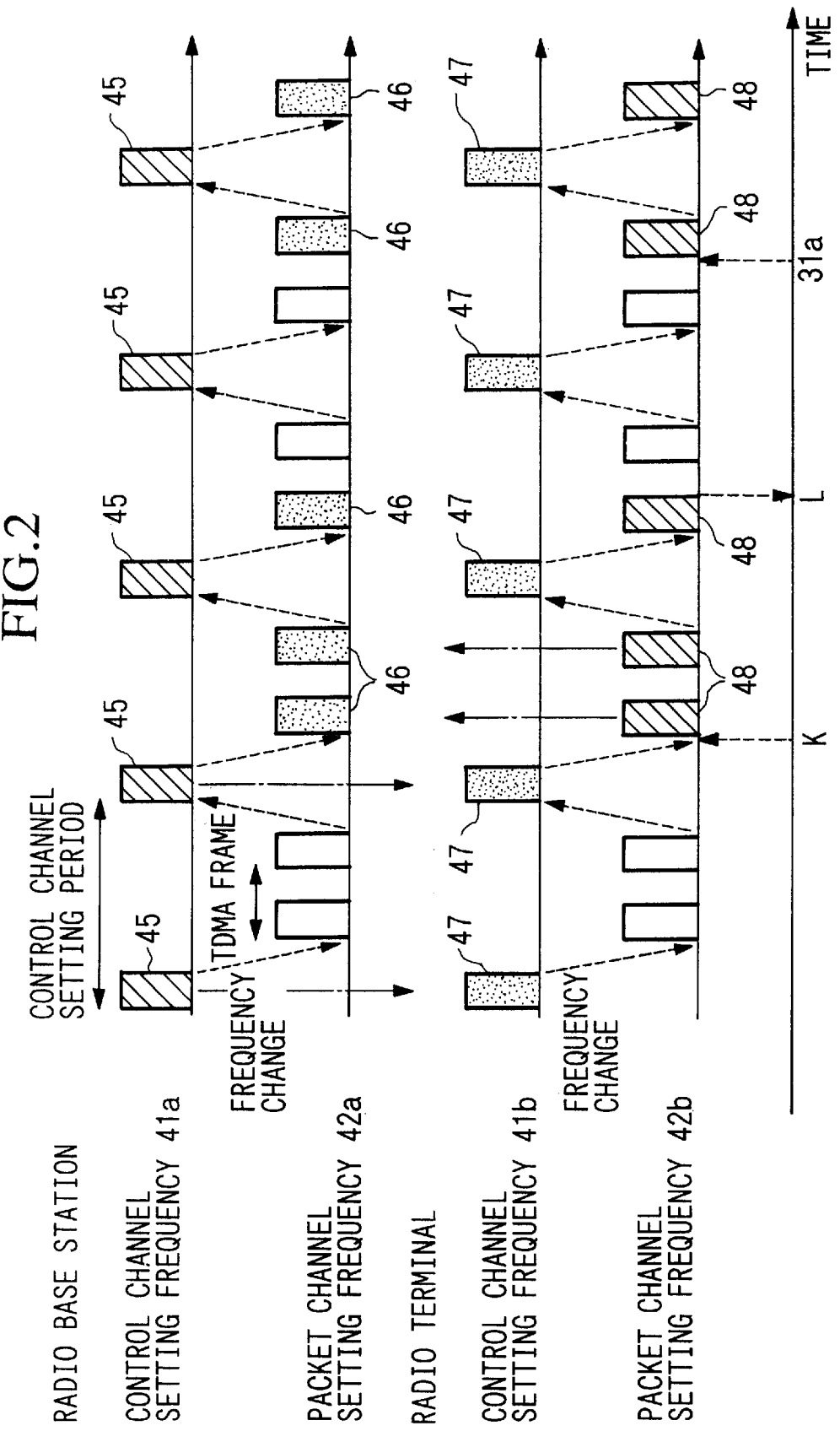

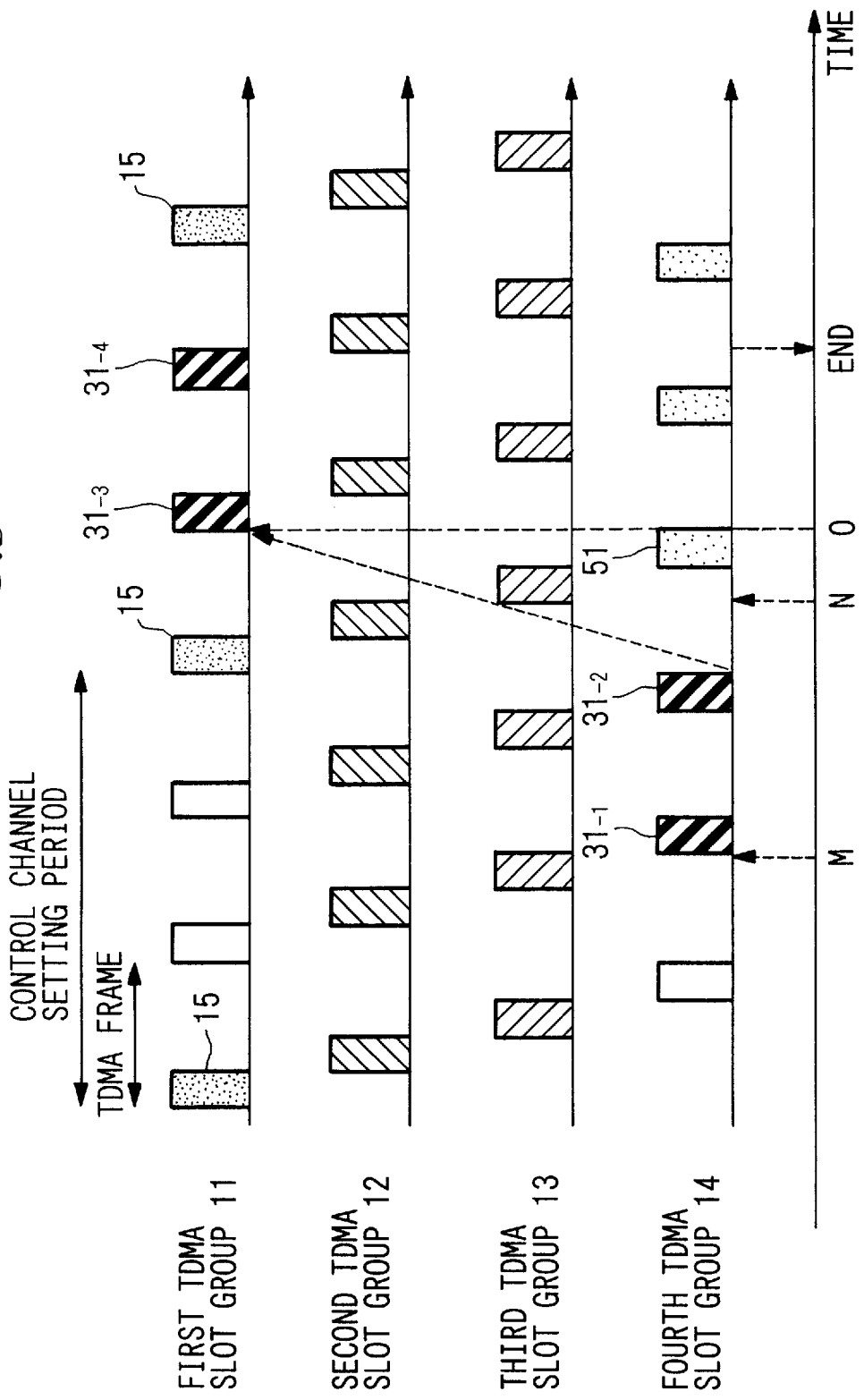

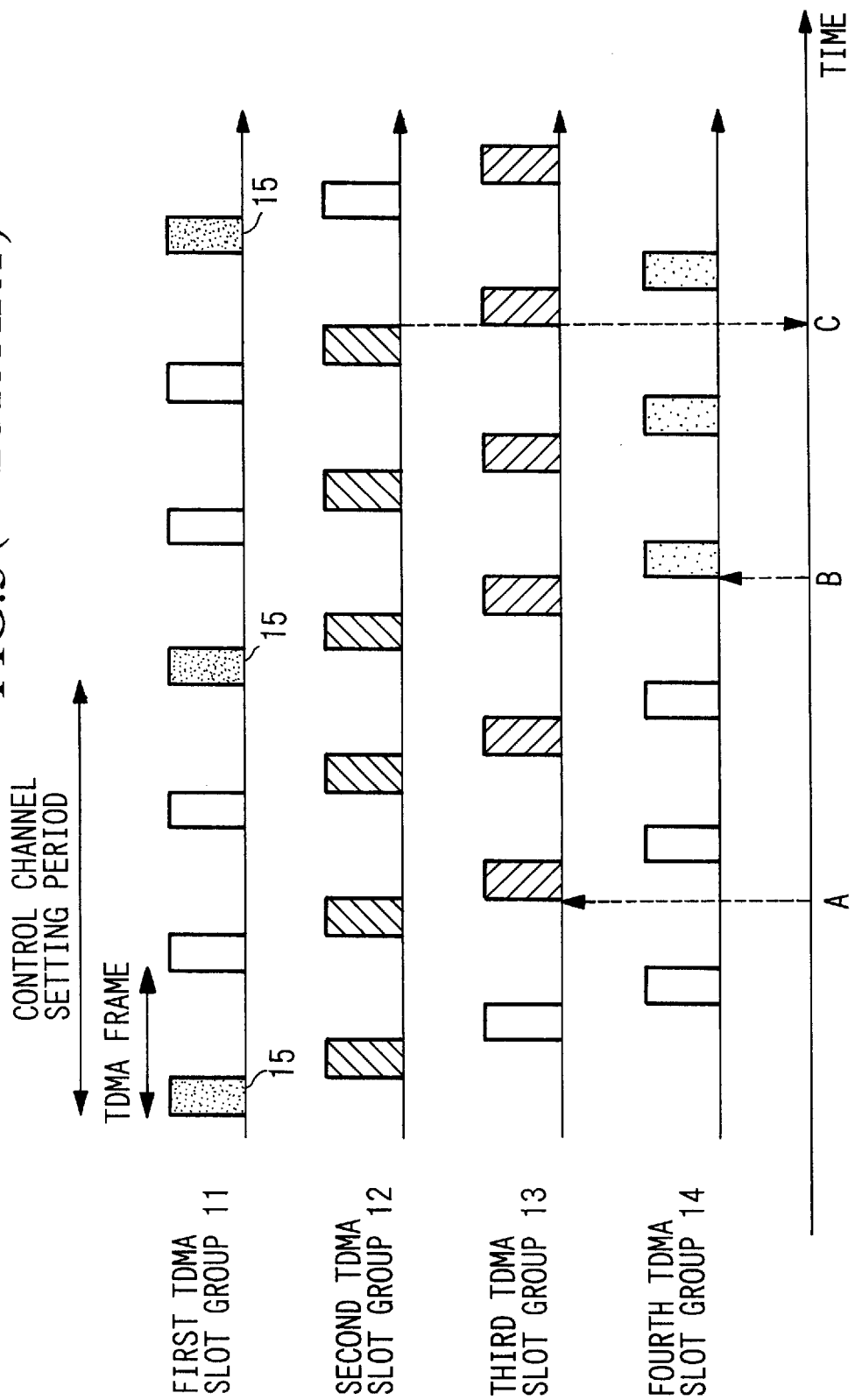

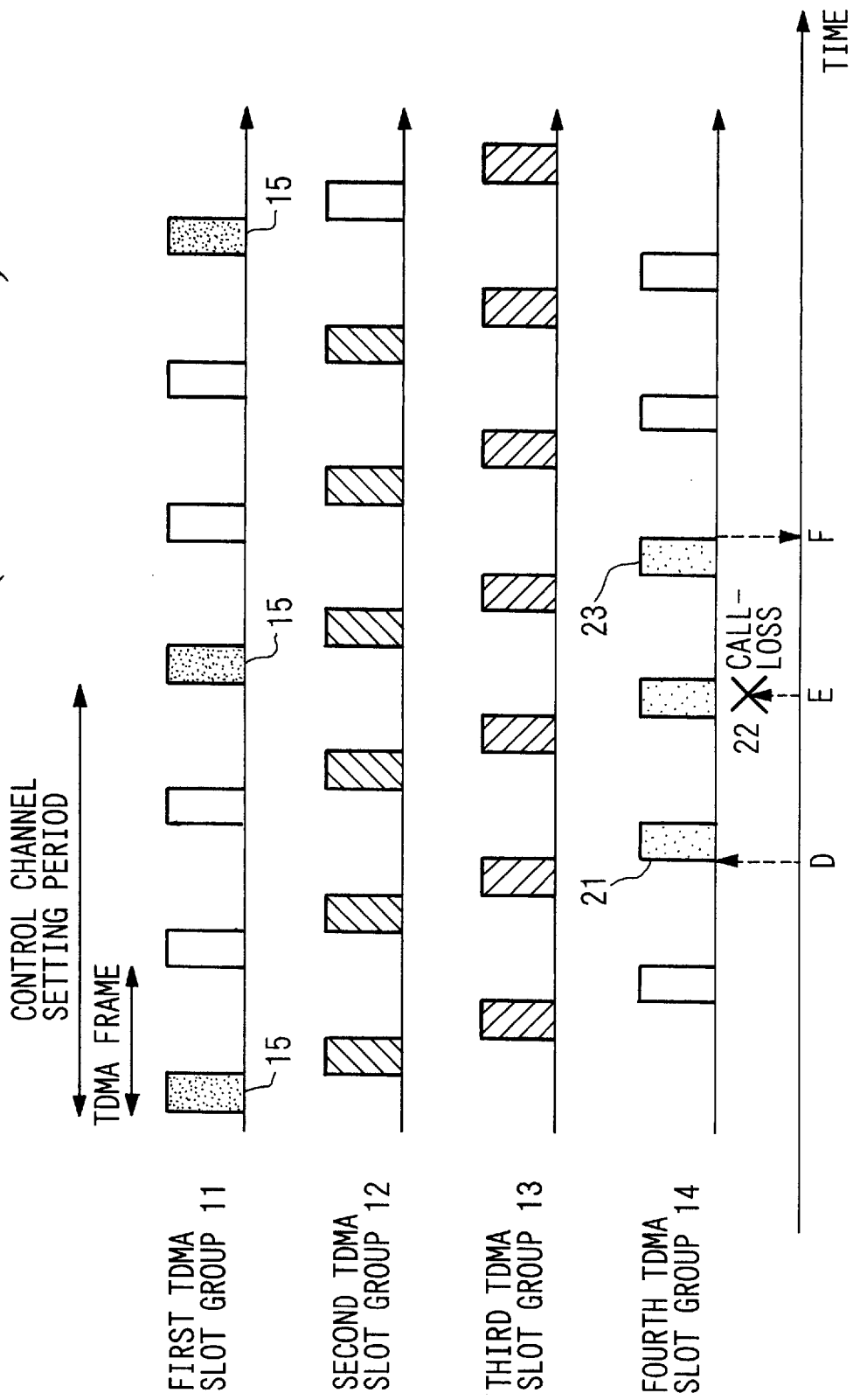

METHOD AND SYSTEM FOR DATA COMMUNICATION

BACKGROUND OF THE INVENTION

1. Field of the Invention

The present invention relates to a method and system for radio data communication, etc., whereby circuit-switched communication and packet-switched communication are intermingled according to a TDMA mode.

2. Related Art

First, characteristics of the circuit-switched communication and the packet-switched communication will be briefly explained below. When a circuit-switched communication is carried out between a radio base station and a radio terminal, a radio link is established using a radio channel and the link continues to be held whether there is data to be sent or received or not. Therefore, the circuit-switched communication is not suitable to effectively use the radio channel although it is always possible to send and receive data without delay while the radio link is held.

On the other hand, in the packet-switched communication, a radio link is only established at a necessary period (when sending and receiving data) and the radio link never continues wastefully to be held. In the packet-switched communication, data is transmitted in the form of a packet (dividing into a constant capacity unit) with adding an address of a receiving side to the data, and during the communication, it is not necessary to always hold the radio link. Therefore, radio channel resources can be effectively used in the packet-switched communication. However, a delay occurs necessarily to use an idle radio channel.

FIG. 5 is a timing chart to explain a communication method to execute a data communication call in a circuit switching form (circuit-switched data) and a data communication call in a packet switching form (packet-switched data) simultaneously by TDMA (Time Division Multiple Access) using a conventional four-slot-structure. In FIG. 5, one in four slots is used for a control channel, and the repetition period of this control channel is set every three TDMA frames. In this figure, the abscissa axis shows elapsed time, and first TDMA slot group 1—fourth TDMA slot group 14 are arranged lengthwise. Also, each cell represents one of the TDMA slots, and while a hatched or dotted cell is a used slot, a plain cell is an idle slot. Here, the first TDMA slot group 11 is used as a control channel 15, and a repetition period of control channel 15 is set every three TDMA frames as mentioned above. Also, the second TDMA slot group 12 is already used for circuit-switched data.

A new circuit-switched data is generated at time point A in FIG. 5. There, the use of the third TDMA slot group 13 is begun corresponding to the generated data. Moreover, a packet-switched data originates at point B. Corresponding to that, the fourth TDMA slot group 14 is begun to use halfway. The use of the first TDMA slot group 11 of the control channel after this is repeated every three TDMA periods. However, the second TDMA slot group 12 to the fourth TDMA slot group 14 are changed to a condition having an idle slot being accompanied by ending of the circuit-switched data or the packet-switched data (e.g., at point C). In this way, a TDMA slot group having an idle slot is begun to be used when a new call is generated in a communication method shown in FIG. 5.

FIG. 6 is a timing chart that explains a case where a circuit-switched data becomes a call-loss because there is no idle slot in a conventional data communication method. In FIG. 6, the first TDMA slot group 11 is used for control channel 15, and the second TDMA slot group 12 and the third TDMA slot group 13 are already used for circuit-switched data. In FIG. 6, a packet-switched data 21 originates at point D. Then, the fourth TDMA slot group 14 that has an idle slot is begun to be used at the point correspondingly to it. If a circuit-switched data 22 is generated at point E immediately after origination of data 21, because there is no idle slot in the fourth TDMA slot group 14, a call-loss originates at point E. Moreover, in FIG. 6, immediately after this, the use of packet-switched data 21 ends by point F and the fourth TDMA slot group 14 changes to have an idle slot. In this way, FIG. 6 shows an example wherein the circuit-switched data 22 has a call-loss due to the small little time difference between the origination of packet-switched data 21 and the origination of circuit-switched data 22.

Here, it is supposed that circuit-switched data 22 originates earlier than packet-switched data 21. In this case, as may be understood from FIG. 5 or FIG. 6, generally, the time of use for the circuit-switched data is longer than that for the packet-switched data. Therefore, not only long stand-by time until transmission of this packet-switched data 21, but also call-loss when the stand-by time exceeds the permitted delay time, results caused. As mentioned above, a circuit-switched data in TDMA data communication immediately becomes a call-loss if there is no idle slot when it is generated. Because a TDMA slot group is used continuously while a radio link is held, even if there is no significant data on the way, the slot use time becomes comparatively long. Therefore, the packet-switched data may have to wait for a long time until an idle slot originates, even if the packet length is short, and this is not efficient.

SUMMARY OF THE INVENTION

The present invention was made in view of the above situation to provide a method for data communication for making intermingling of the circuit-switched communication and the packet-switched communication possible with good efficiency. It is an object of the present invention to provide a method for data communication that uses a radio link by time division for the circuit-switched data and the packet-switched data to suppress occurrence of call-loss when a circuit-switched data newly arrives, and to communicate packet-switched data efficiently. Moreover, a system for data communication according to the present invention provides a radio base station and a radio terminal that implement circuit-switched communication and packet-switched communication between these stations.

According to a first aspect of the present invention, a method for data communication wherein circuit-switched communication and packet-switched communication is implemented according to (n+m) multiple TDMA communication mode whereby one frame consists of n slots for control channel and m slots for traffic channel (n and m are natural numbers) and a control signal is transmitted intermittently using a slot for control channel comprises the steps of assigning sequentially a generated circuit-switched data to an idle slot among slots for traffic channel; and assigning a generated packet-switched data to an idle slot among slots for control channel, which belong to a frame wherein a control signal is not transmitted.

According to a second aspect of the present invention, a method for data communication wherein circuit-switched communication and packet-switched communication is implemented according to (n+m) multiple TDMA communication mode whereby one frame consists of n slots for control channel and m slots for traffic channel (n and m are natural numbers) and a control signal is transmitted intermittently using a slot for control channel comprises the steps of, if a packet-switched data is generated when an idle slot does not exist at each slot for traffic channel, assigning the generated packet-switched data to a slot for control channel, which belongs to a frame wherein a control signal is not transmitted; if an idle slot exists at each slot for traffic channel, assigning the generated packet-switched data and a generated circuit-switched data to the idle slot; and if a circuit-switched data is generated when a packet-switched data is assigned to a slot for traffic channel, and moreover if an idle slot does not exist at each slot for traffic channel, after again assigning the packet-switched data that is assigned to the slot for traffic channel to a slot for control channel of a frame wherein a control signal is not transmitted, assigning the circuit-switched data to an idle slot of each slot for traffic channel.

According to a third aspect of the present invention, a radio base station that transmits a control signal intermittently using a slot for control channel and implements circuit-switched communication and packet-switched communication according to (n+m) multiple TDMA communication mode whereby one frame consists of n slots for control channel (n is a natural number) and m slots for traffic channel (m is a natural number) comprises a portion for broadcasting a radio frequency and a slot number which can be used for packet switching using a control signal; a portion for assigning a packet-switched data to the radio frequency (hereinafter, called a "packet channel setting frequency") except an exclusive use radio frequency for the control signal (hereinafter called a "control channel setting frequency"), with giving priority to the data, at a transmission timing of slots for control channel, based on the radio frequency and the slot number which the broadcasting portion indicates when the packet-switched data is generated; and a portion for changing a transmission frequency to the control channel setting frequency from the packet channel setting frequency just before a transmission timing of a control signal and changing the transmission frequency to the packet channel setting frequency from the control channel setting frequency immediately after the transmission timing of the control signal.

According to a fourth aspect of the present invention, a radio base station that transmits a control signal intermittently using a slot for control channel and implements circuit-switched communication and packet-switched communication according to (n+m) multiple TDMA communication mode whereby one frame consists of n slots for control channel (n is a natural number) and m slots for traffic channel (m is a natural number) comprises a portion for broadcasting a radio frequency and a slot number which can be used for packet switching using a control signal; a portion for assigning a packet-switched data to a slot for traffic channel, with giving priority to the data, when the packet-switched data is generated; a portion for changing the assigned slot for the packet-switched data to a slot for control channel from the slot for traffic channel and assigning a circuit-switched data to an idle slot for traffic channel based on the radio frequency and the slot number that are indicated by the broadcasting portion if there is no idle slot among slots for traffic channel when the circuit-switched data is generated.

According to another aspect of the present invention, a system for data communication that implements circuit-switched communication and packet-switched communication comprises a radio base station that transmits a control signal intermittently using a slot for control channel and implements circuit-switched communication and packet-switched communication according to (n+m) multiple TDMA communication mode whereby one frame consists of n slots for control channel (n is a natural number) and m slots for traffic channel (m is a natural number), which comprises a packet-switched data processing portion for storing a packet-switched data to input and output; a packet-switched data separating portion for directly outputting the packet-switched data from the packet-switched data processing portion and a control signal in transmission, and for separating the packet-switched data and the control signal and outputting them to input-output terminals of the packet-switched data processing portion and the control signal in reception; a slot associating portion, being connected with input-output terminals of the packet-switched data processing portion and for circuit-switched data, for inputting and outputting calls to send and receive, and for associating TDMA slots with the calls to send and receive; a time division processing portion, being connected with the slot associating portion and the packet-switched data separating portion, for assembling and disassembling the TDMA slots and TDMA frames; a radio sending and receiving portion for sending and receiving the calls to be sent and received with the TDMA frame as an unit, which is connected with the time division processing portion; and a control portion for having the packet-switched data processing portion output a packet-switched data which is stored therein to one of the packet-switched data separating portion and the slot associating portion by indicating a slot timing which can be used for packet switching and moreover for indicating a radio frequency to be used to the radio sending and receiving portion if a packet-switched data is generated, for transmitting the packet-switched data using an idle slot among slots for traffic channel if outputting the packet-switched data to the slot associating portion, and for transmitting the packet-switched data using an idle slot among slots for control channel if outputting the packet-switched data to the packet-switched data separating portion; and a radio terminal that receives a control signal being sent intermittently from the radio base station using a slot for control channel and implements circuit-switched communication and packet-switched communication according to the (n+m) multiple TDMA communication mode, which comprises a packet-switched data processing portion for storing a packet-switched data to input and output; a packet-switched data separating portion for directly outputting the packet-switched data from the packet-switched data processing portion and a control signal in transmission time, and for separating the packet-switched data and the control signal and outputting them to input-output terminals of the packet-switched data processing portion and the control signal in reception time; a slot associating portion, being connected with input-output terminals of the packet-switched data processing portion and for circuit-switched data, for inputting and outputting calls to send and receive, and for associating TDMA slots with the calls to send and receive; a time division processing portion, being connected with the slot associating portion and the packet-switched data separating portion, for assembling and disassembling the TDMA slots and TDMA frames; a radio sending and receiving portion for sending and receiving the calls to be sent and received with the TDMA frame as an unit, which is connected with the time division processing portion; and a control portion for having the packet-switched data processing portion output a packet-switched data which is stored therein to one of the packet-switched data separating portion and the slot associating portion by indicating a slot timing which can be used for packet switching and moreover for indicating a radio frequency to be used to the radio sending and receiving portion if a packet-switched data is generated, for transmitting packet-switched data using an idle slot among slots for traffic channel if outputting the packet-switched data to the slot associating portion, and for transmitting packet-switched data using an idle slot among slots for control channel if outputting the packet-switched data to the packet-switched data separating portion.

BRIEF DESCRIPTION OF THE DRAWINGS

FIG. 1 is a timing chart that explains a method for data communication according to a first preferred embodiment of the present invention.

FIG. 2 is a timing chart that explains a method of communication to transmit data from a radio terminal to a radio base station according to first preferred embodiment of the present invention.

FIG. 3 is a timing chart that explains a second preferred embodiment according to the present invention.

FIG. 5 is a timing chart to explain a method to communicate a circuit-switched data and a packet-switched data with a conventional four-slot-TDMA.

FIG. 6 is a timing chart to explain a case where an idle slot does not exist and a circuit-switched data becomes a call-loss in a conventional data communication method.

DESCRIPTION OF THE PREFERRED EMBODIMENTS

Figure 4A:
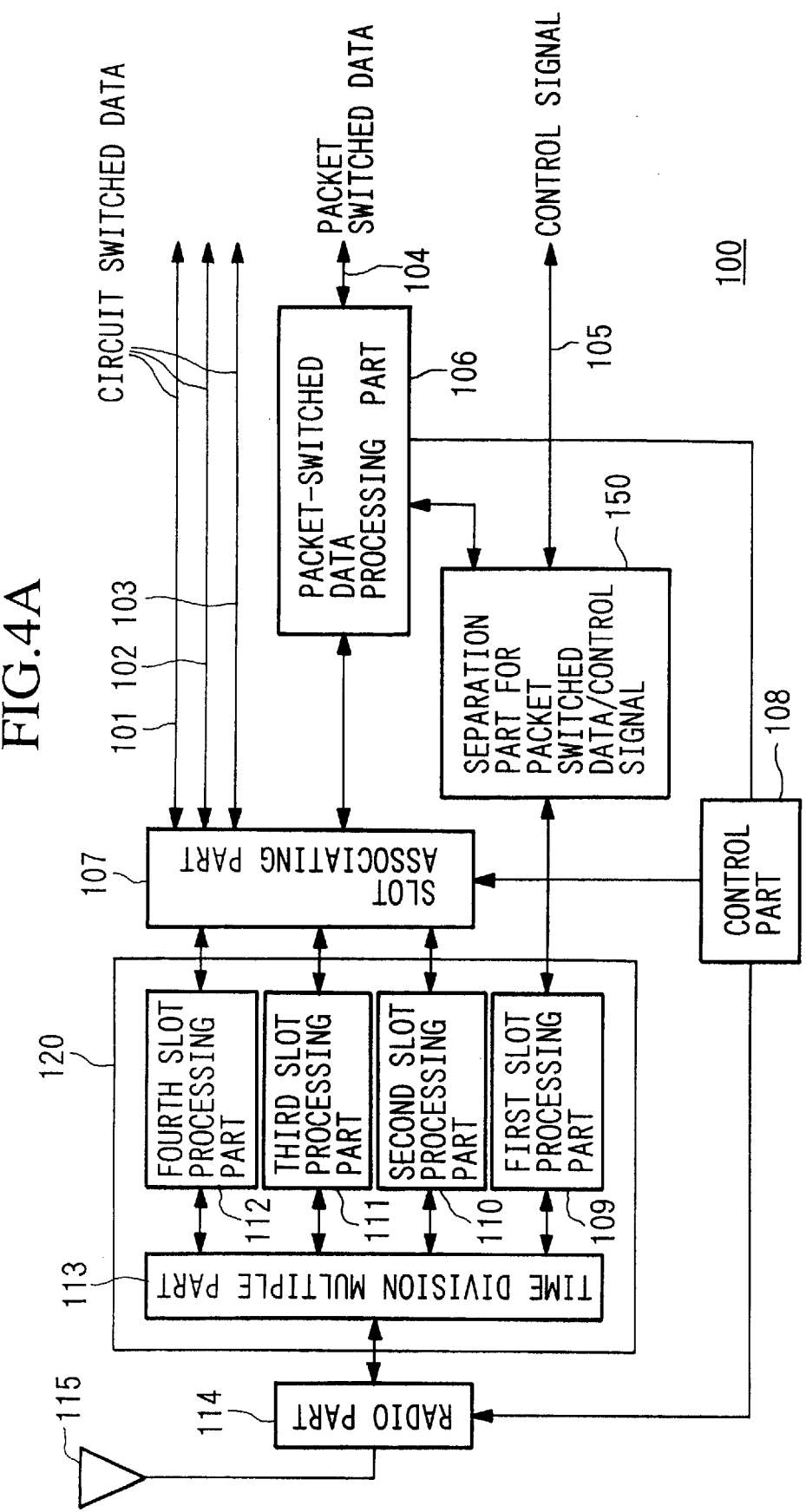
FIG. 4A is a block diagram which shows a structure of a radio base station according to the present invention.

Below, preferred embodiments of a method and system for data communication according to the present invention will be explained referring to the drawings.

First Preferred Embodiment

FIG. 1 is a timing chart to explain a method for data communication of a first embodiment according to the present invention. In FIG. 1, the abscissa axis shows time elapsed, and a first TDMA slot group 11 to a fourth TDMA slot group 14 are arranged lengthwise. A circuit-switched communication and packet-switched communication are implemented by time division access using the first TDMA slot group 11 to the fourth TDMA slot group 14. Some other data including an address of a receiving side, etc., is added to each packet that is transmitted by the packet-switched communication of this preferred embodiment. Each cell represents one of TDMA slots; a cell which is hatched with thin lines or is dotted is a used slot, whereas a plain cell is an idle slot. Moreover, the slot hatched with bold lines (bold right sloping lines or bold left sloping lines) is a slot that is used for the packet-switched data, and which will be explained later.

In FIG. 1, the first TDMA slot group 11 is used for control channel 15. This control channel 15 uses the first TDMA slot group 11 every three TDMA periods. The second TDMA slot group 12 and the third TDMA slot group 13 are already used with circuit-switched data respectively, and only the fourth TDMA slot 14 has an idle slot, at the beginning of the time axis. It is supposed that a packet-switched data 31 originates at point G in FIG. 1. Generally, a packet-switched data does not require being forwarded immediately when the packet-switched data is generated. Therefore, it is possible to wait until an idle slot is found within a range of a permissible connection delay time, even if there is no TDMA slot group that can be used when the packet-switched data originates. Also, the packet-switched data is not hindered from communicating, even if an interruption is generated before the data ends, and a waiting time occurs on the TDMA slot on which the packet data is transmitted because the data is handled by a packet unit.

When a packet-switched data 31 originates at point G, the first TDMA slot group 11 which control channel 15 is set is used for the data, and the vacant fourth TDMA slot group 14 is secured as it is for a future circuit-switched data. That is, after packet-switched data 31 originates, first, the packet-switched data 31-1 is transmitted using the first TDMA slot group 11 (hatched with bold right sloping lines). It is supposed that a circuit-switched data 32 is generated at point H after this. Because the fourth TDMA slot 14 is vacant at this time, a transmission of the circuit-switched data 32 begins using this slot. At point I, the first TDMA slot group 11 is used for control channel 15, and moreover, after this, a second data 31-2 of the packet-switched data 31 is transmitted using the first TDMA slot group 11. Moreover, it is supposed that a packet-switched data 33 originates at point J. When the packet-switched data 33 originates, the first TDMA slot group 11 to which control channel 15 is set is assigned to each call including data 33 in common. Here, the packet-switched data 33-1 that is shown by a cell hatched with bold left inclination lines is transmitted using the first TDMA slot group 11. Therefore, in this case, all of the second TDMA slot group 12 to the fourth TDMA slot group 14 are used, but a call-loss does not occur.

Also, because an address data of a receiving side is added to the packets 31 and 33 respectively as mentioned above, the packets 31 and 33 do not collide, which are transmitted using the first TDMA slot group 11, even if they share an identical channel for packet communication.

In this way, according to the present invention, a packet-switched data is transmitted using a TDMA frame wherein a control channel is not transmitted of a TDMA slot group that is set for a control channel.

FIG. 2 is a timing chart to explain a communication method to transmit data from a radio terminal (a mobile station, i.e., a slave station) to a radio base station (a fixed station, i.e., a master station) in the same preferred embodiment in FIG. 1. Hereinafter, communication from a radio terminal to a radio base station is called upward communication, and communication from the radio base station to the radio terminal is called downward communication. Also, different radio frequencies are used when setting a control signal and a packet-switched data to different slots of the control channel according to a communication method shown in this figure. In this figure, the abscissa axis represents a time elapsed, and the upper axis corresponds to a control channel setting frequency 41a and the next upper axis corresponds to a packet channel setting frequency 42a at a position of the radio base station. The next upper axis corresponds to a control channel setting frequency 41b, and the lower axis corresponds to a packet channel setting frequency 42b at a position of the radio terminal.

All cells in FIG. 2 represent the TDMA slot group that a control channel is set, which corresponds to the first TDMA slot group 11 in FIG. 1. That is, when the radio base station carries out a control signal transmission 45 on the control channel setting frequency 41a, the corresponding radio terminal carries out a control signal reception 47 on a control channel setting frequency 41a. In FIG. 2, an upward packet-switched data 31a originates at point K and ends at point L. In this case, upward packet transmission 48 is carried out from the radio terminal using the packet channel setting frequency (axes of 42a, 42b) and upward packet reception 46 is carried out in the radio base station.

A problem for transmission is not caused in the preferred embodiment shown in FIG. 2, because a certain amount of connection delay is permitted for a packet-switched data, as mentioned above, although upward packet sending 46 and receiving 48 is stopped temporarily by control signal sending 45 and receiving 47. That is, a control signal sending and receiving 45 and 47 is possible during packet communication. In this way, as shown in this figure, the radio base station and the radio terminal change a setting frequency from the control channel setting frequency (axes of 41a, 41b) to the packet channel setting frequency (axes of 42a, 42b), respectively, immediately after the timing of the control channel, and they take an operation that prepares for sending and receiving of the packet-switched data in the following TDMA frame, and they take an operation to change the setting frequency again just before the timing of the control channel, respectively.

On the other hand, although a downward packet communication is not illustrated in this figure, it is clear to implement the downward communication by reversing each sending and receiving radio base station/radio terminal, and with a similar way being explained with FIG. 2.

Second Preferred Embodiment

FIG. 3 is a timing chart to explain a second preferred embodiment of the present invention. In this figure, the abscissa axis represents the time elapsed, and the first TDMA slot group 11 to the fourth TDMA slot group 14 are arranged lengthwise. In FIG. 3, the first TDMA slot group 11 is used for control channel 15, and the second TDMA slot group 12 and the third TDMA slot group 13 are already used for circuit-switched data at the beginning. Also, control channel 15 uses the first TDMA slot group every three TDMA periods.

A packet-switched data 31 originates at point M in FIG. 3. In this preferred embodiment, first, transmission of the packet-switched data 31 is begun using the fourth TDMA slot group 14 that has an idle slot. Next, a circuit-switched data 51 originates at point N where transmission of the packet-switched data 31-1 and the packet-switched data 31-2 finishes. The following packet-switched data 31 is transmitted using the slot group 11 to which a control channel is set. That is, packet-switched data 31-3 and packet-switched data 31-4 are transmitted using the first TDMA slot group 11 from point 0 until these packet-switched data ends as shown in FIG. 3. Therefore, because the fourth TDMA slot group 14 has an idle slot, circuit-switched data 51 can be assigned to this fourth TDMA slot group 14, and the circuit-switched data 51 can be transmitted without occurrence of a call-loss.

According to this method, packet-switched data can be transmitted faster compared with the first preferred embodiment. The reason is that, according to this preferred embodiment, it is possible that the packet-switched data can be immediately transmitted and it is not necessary to avoid a timing when a control channel is transmitted because packet-switched data is transmitted using an idle TDMA slot until all TDMA slots are used by circuit-switched data.

In addition, as a modification example of the above-mentioned method, a method consisting of the following steps can be contemplated. First, as far as multiple slot groups exist, which can be used by circuit-switched data when a packet-switched data originates, an idle slot group is assigned to the packet-switched data in a manner as described above. Second, if there is only one slot group that can be used for circuit-switched data, the slot group is secured for a circuit-switched data that may originate later, and the TDMA slot group to which a control channel is set is assigned to the packet-switched data that has now originated.

Moreover, other methods may be contemplated according to the present invention, to control assignment adaptively to traffic of circuit-switched data, when a packet-switched data is generated, by way of assigning a slot group that can be used for the circuit-switched data for the packet-switched data if there is only one idle slot as explained with FIG. 3 or by way of assigning a TDMA slot group to which a control channel is always set for the packet-switched data as explained with FIG. 1, or by a combination of those. One modification example comprises a step of assigning the packet-switched data to an idle slot for traffic channel if a packet-switched data cannot be assigned to a slot for control channel, and a step of changing the destination of the assignment for the packet-switched data to the slot for control channel from the slot for traffic channel when there is an idle slot for control channel.

In addition, although the control channel setting frequency (axes of 41a, 41b) and the packet channel setting frequency (axes of 42a, 42b) which are shown in FIG. 2 are different from each other in the above-mentioned first preferred embodiment, these frequencies may be identical to implement the present invention. Also, a number of the TDMA slot, a frame period of the control channel, etc., are not limited to those which are defined in connection with the preferred embodiments explained above.

Third Preferred Embodiment

Figure 4B:
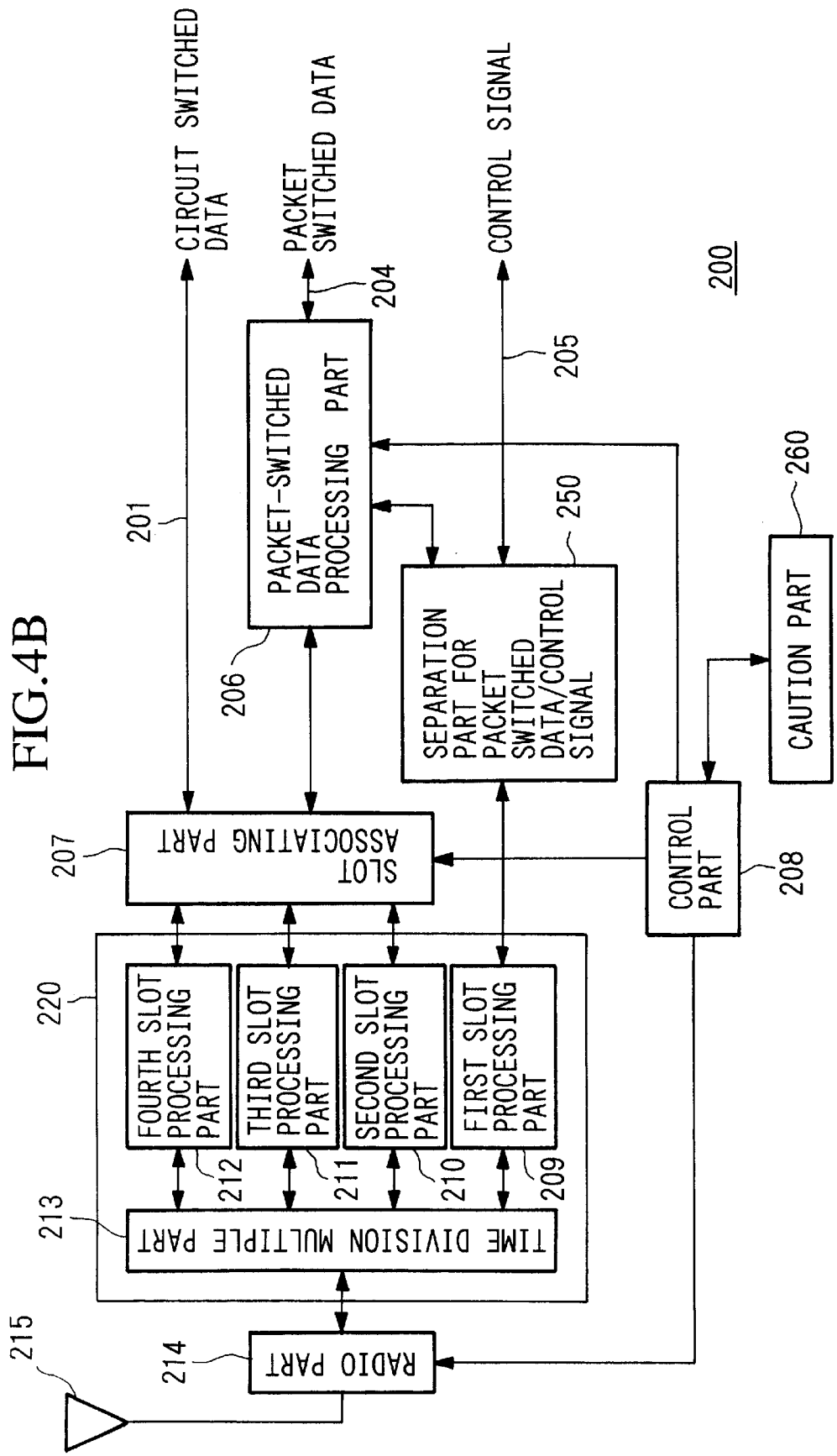
FIG. 4B is a block diagram which shows a structure of a radio terminal according to the present invention.

FIG. 4A is a block diagram which shows a structure of a radio base station in a data communication system according to the present invention and FIG. 4B is a block diagram which shows a structure of a radio terminal which communicates mutually with the radio base station in FIG. 4A. The structure of the radio base station in FIG. 4A and the radio terminal in FIG. 4B is applied to a system wherein a number of divided slots of the TDMA frame is four and the first slot is set as a control channel. The radio base station 100 that is shown in FIG. 4A can provide three traffic channels for circuit-switched data at the same time by using three slot groups, except for one slot group being set as the control channel among the four slots. Radio base station 100 is equipped with input-output terminals 101–103 for three circuit-switched data, one input-output terminal 104 for the packet-switched data, and a time division processing part 120 that assembles the data that is inputted and outputted from each terminal into a TDMA frame and disassembles it. This time division processing part 120 is composed from the first to fourth slot processing part 109–112 and time division multiple part 113. The transmission packet that is inputted from input-output terminal 104 is stored in packet-switched data processing part 106 until an indication is provided from control part 108. The control signal to be transmitted is inputted to separation part 150 for the packet-switched data/control signal from control signal input-output terminal 105 at the setting period of the control channel and moreover is supplied to the first slot processing part 109 through separation part 150 for the packet-switched data/control signal. If there is a transmission packet that is stored in packet-switched data processing part 106, control part 108 first determines whether there is an idle slot for traffic channel, and when there is an idle slot for traffic channel, control part 108 outputs an indication to packet-switched data processing part 106 to output a stored transmission packet to slot associating part 107 at a timing that corresponds to a timing of an idle slot for traffic channel, with which it is possible to transmit the packet-switched data. Then, the transmission packet is assigned to the idle slot for traffic channel and is transmitted as described later in detail. On the other hand, if there is no idle slot for traffic channel, control part 108 provides packet-switched data processing part 106 with an indication at a timing that corresponds to an idle slot number of the first slot (for the control channel) which is determined based on setting conditions of control signals to output the transmission packet to separation part 150 for the packet-switched data/control signal. In separation part 150 for the packet-switched data/control signal, all transmitted data are forwarded to the first slot processing part 109 just as it is. Therefore, the transmission packet is immediately forwarded to the first slot processing part 109 and is assigned to the idle slot of the first slot.

In addition, in separation part 150 for the packet-switched data/control signal, if the inputted data is a received data, depending on whether it is packet-switched data or a control signal, it is separated and outputted to either of packet-switched data processing part 106 or input-output terminal 105 for the control signal. Also, if using different frequencies depending on the case to send and receive a control signal with the first slot of each TDMA frame and the case to send and receive packet-switched data, control part 108 specifies the frequency which radio part 114 should use. That is, when using different frequencies, control part 108 outputs an indication to radio part 114 to change a frequency to the frequency for the control signal immediately before the timing to transmit a control signal, and to change the frequency to the frequency for the packet communication that is different from the frequency for the control signal immediately after transmitting a control signal.

Slot associating part 107 has a switching function, which switches input/output of data and associates communication call that is inputted and outputted through input-output terminals 101–103 and packet-switched data processing part 106 with each TDMA slot to be sent and received according to the control signal from control part 108. In first to fourth slot processing parts 109–112, processing such as assembling/disassembling slots is implemented. Then, in time division multiple part 113, processing such as assembling/disassembling TDMA frames is accomplished. Therefore, each communication call that is inputted to slot associating part 107 is arranged to a data form which corresponds to each slot in the second to fourth slot processing parts 110–112 and moreover is assembled into a form of a TDMA frame in time division multiple part 113. Then, the TDMA frame that is assembled in time division multiple part 113 is changed into a radio signal in radio part 114 and is transmitted from antenna part 115.

On the other hand, the radio signal that is received by antenna part 115 is inputted to time division multiple part 113 after being demodulated to data in radio part 114, and is disassembled to data for every slot, after that, the following processes trace the course contrary to the above mentioned one for transmission and the data is finally outputted to each of input-output terminals 101–105.

On the other hand, the radio terminal 200 that is shown in FIG. 4B has the function which is approximately the same as that implemented by each element of the radio base station 100 of FIG. 4A. The radio terminal 200 is equipped with input-output terminal 201 for circuit-switched data, input-output terminal 204 for packet-switched data, control signal input-output terminal 205, packet-switched data processing part 206, slot associating part 207, control part 208, separation part 250 for packet-switched data/control signal, time division processing part 220 that comprises first to fourth slot processing parts 209, 210, 211, and 212 and the time division multiple part 213, radio part 214, and antenna part 215. Radio terminal 200 receives the control signal that is transmitted from radio base station 100, and confirms the packet channel to which packet-switched data is set based on the control signal, and then implements packet communication. If using two different frequencies for transmitting both of the control signal and the packet-switched data with the slot for control channel for the control, radio terminal 200 changes a reception frequency in radio part 214 according to the reception timing of the control signal. In other words, radio part 214 changes a reception frequency to the setting frequency of the control channel from the setting frequency of the packet channel immediately before the reception timing of the control signal according to the indication from control part 208, and changes the reception frequency to the packet channel setting frequency from the control channel setting frequency immediately after the reception timing of the control signal. Radio terminal 200 also has a function to inform a user about a condition of communication by displaying at a monitor or outputting a warning sound from caution part 260 by the indication of control part 108, if it is not possible to assign the packet-switched data that is inputted from input-output terminal 204 for packet-switched data to a slot for control channel or a slot for traffic channel within a predetermined constant time. Alternatively, caution part 260 may be eliminated.

As explained above, according to this preferred embodiment, if the second to fourth slots that are slots for traffic channel have idle slots, these slots can be used for packet-switched communication, if there is no idle slot or necessity to change an assignment of a slot to a circuit-switched communication originates, the packet-switched communication can be implemented with a slot for the control channel at once.

Furthermore, although the second to fourth slots that are slots for traffic channel are assigned primarily for the packet-switched data if there is an idle slot for traffic channel to implement packet switching type communication in this preferred embodiment, by changing the contents of control of the control part 108 and 208 and using a similar structure with this embodiment, it is possible to assign packet-switched data primarily to the first slot that is a slot for control channel. Although the structure of the above-mentioned embodiment is designed for a communication system of the four-channel multiple TDMA communication mode using three traffic channels and one control channel, the number of each channel is not necessarily limited to this example, e.g., the number of the control channels can be set to equal to or more than two.

In addition, the correspondence relation of each structure that is explained in the third preferred embodiment and each element that will be described in claims is as follows.

Packet-switched data processing means: packet-switched data processing part 106, 206

Packet-switched data separating means: Separation part 150 for packet-switched data/control signal, Separation part 250 for packet-switched data/control signal Slot associating means: slot associating part 107, 207

Time division processing means: time division processing part 120,220

Radio sending and receiving means: a respective combination of radio part 114, 214 and antenna part 115, 215

Control means: control part 108,208

According to the present invention as explained above, a packet-switched data that is generated is assigned to an idle slot among slots for control channel in order. Therefore, in data communication wherein circuit-switched data and packet-switched data are set via a time division radio link, the probability of occurrence of call-loss at the time when a circuit-switched data is newly generated can be reduced. Moreover, the packet-switched data can be efficiently set, and it is possible to be realized for a data communications method and system for circuit-switched communication and packet-switched communication to be efficiently intermingled.

What is claimed is:

1. A method for data communication wherein circuit-switched communication and packet-switched communication is implemented according to (n+m) multiple TDMA communication mode whereby one frame consists of n slots for control channel and m slots for traffic channel, n and m being natural numbers, and a control signal is transmitted intermittently using a slot for control channel, which comprises the steps of:

if a packet-switched data is generated when an idle slot does not exist among the slots for traffic channel, assigning said generated packet-switched data to a slot for control channel, which belongs to a frame wherein a control signal is not transmitted;

if an idle slot exists among the slots for traffic channel, assigning said generated packet-switched data and a generated circuit-switched data to the idle slot; and if a circuit-switched data is generated when a packet-switched data is assigned to a slot for traffic channel and moreover an idle slot does not exist among the slots for traffic channel, after again assigning the packet-switched data that is assigned to the slot for traffic channel to a slot for control channel of a frame wherein a control signal is not transmitted, assigning the circuit-switched data to an idle slot of each slot for traffic channel.

2. A method for data communication according to claim 1, wherein after assigning a generated packet-switched data to an idle slot when an idle slot exists among the slots for traffic channel, if another packet-switched data is generated, assigning the packet-switched data of the latter to a common slot for traffic channel which is assigned for the packet-switched data of the former; and if a circuit-switched data is generated when a packet-switched data is assigned for each slot for traffic channel and moreover an idle slot does not exist at each slot for traffic channel, after again assigning all packet-switched data that is identically assigned to each slot for traffic channel to a slot for control channel of a frame wherein a control signal is not transmitted, assigning the circuit-switched data to an idle slot of each slot for traffic channel.

3. A radio base station that transmits a control signal intermittently using a slot for control channel and implements circuit-switched communication and packet-switched communication according to (n+m) multiple TDMA communication mode whereby one frame consists of n slots for control channel, n being a natural number, and m slots for traffic channel, m being a natural number, comprising:

means for broadcasting a radio frequency and a slot number which can be used for packet switching using a control signal;

means for assigning a packet-switched data to the radio frequency to determine a packet channel setting frequency, except an exclusive use radio frequency for said control signal to determine a control channel setting frequency, and giving priority to the data, at a transmission timing of slots for control channel, based on the radio frequency and the slot number which said broadcasting means indicates when the packet-switched data is generated; and means for changing a transmission frequency to said control channel setting frequency from said packet channel setting frequency just before a transmission timing of a control signal and changing the transmission frequency to said packet channel setting frequency from said control channel setting frequency immediately after the transmission timing of said control signal.

4. A radio base station according to claim 3, further comprising a means for transmitting a plurality of packet-switched data by multiplex transmission using idle slots for control channel.

5. A radio base station according to claim 4, further comprising a means for assigning a packet-switched data to an idle slot for traffic channel if a slot for control channel cannot be assigned for the packet-switched data, and for changing the assigned slot for the packet-switched data to a slot for control channel from the slot for traffic channel at the time when the slot for control channel becomes idle.

6. A radio base station that transmits a control signal intermittently using a slot for control channel and implements circuit-switched communication and packet-switched communication according to (n+m) multiple TDMA communication mode whereby one frame consists of n slots for control channel, n being a natural number, and m slots for traffic channel, m being a natural number, comprising:

means for broadcasting a 0537 radio frequency and a slot number which can be used for packet switching using a control signal;

means for assigning a packet-switched data to a first slot for traffic channel, giving priority to the data when the packet-switched data is generated; and means for changing the assigned slot for the packet-switched data to a slot for control channel from the first slot for traffic channel when there is no idle slot among slots for traffic channel when a circuit-switched data is generated and assigning the generated circuit-switched data to the first slot for traffic channel based on the radio frequency and the slot number that are indicated by said broadcasting means.

7. A radio terminal for implementing circuit-switched communication and packet-switched communication with a radio base station defined in one of claims 3, 4, 5, and 6, comprising:

means for implementing packet-switched communication using a radio frequency and a slot number by confirming the radio frequency and the slot number which can be used for packet switching which are assigned based on a control signal which is intermittently transmitted from the radio base station; and means for changing a receiving frequency to said control channel setting frequency from said packet channel setting frequency just before a receiving timing of a control signal and changing the receiving frequency to said packet channel setting frequency from said control channel setting frequency immediately after a receiving timing of said control signal.

8. A radio terminal that implements circuit-switched communication and packet-switched communication with a radio base station defined in one of claims 3, 4, 5, and 6, comprising:

means for implementing packet-switched communication using a radio frequency and a slot number by confirming the radio frequency and the slot number which can be used for packet switching which are assigned based on a control signal which is intermittently transmitted from the radio base station;

means for changing a receiving frequency to said control channel setting frequency from said packet channel setting frequency just before a receiving timing of a control signal and changing the receiving frequency to said packet channel setting frequency from said control channel setting frequency immediately after a receiving timing of said control signal; and means for indicating a condition that a packet-switched data cannot be assigned, by means of one of a monitor display or a sound device, if the packet-switched data cannot be assigned within a predetermined period of time.

9. A system for data communication that implements circuit-switched communication and packet-switched communication, comprising:

a radio base station defined in one of claims 3, 4, 5, and 6; and a radio terminal that comprising:

means for implementing packet-switched communication using a radio frequency and a slot number by confirming the radio frequency and the slot number which can be used for packet switching which are assigned based on a control signal which is intermittently transmitted from said radio base station; and means for changing a receiving frequency to said control channel setting frequency from said packet channel setting frequency just before a receiving timing of a control signal and changing the receiving frequency to said packet channel setting frequency from said control channel setting frequency immediately after a receiving timing of said control signal.

10. A system for data communication that implements circuit-switched communication and packet-switched communication, comprising:

a radio base station defined in one of claims 3, 4, 5, and 6; and a radio terminal which comprising:

means for implementing packet-switched communication using a radio frequency and a slot number by confirming the radio frequency and the slot number which can be used for packet switching which are assigned based on a control signal which is intermittently transmitted from said radio base station;

means for changing a receiving frequency to said control channel setting frequency from said packet channel setting frequency just before a receiving timing of a control signal and changing the receiving frequency to said packet channel setting frequency from said control channel setting frequency immediately after a receiving timing of said control signal; and means for indicating a condition that a packet-switched data cannot be assigned, by means of one of a monitor display or a sound device, if the packet-switched data cannot be assigned within a predetermined period of time.

11. A radio base station that transmits a control signal intermittently using a slot for control channel and implements circuit-switched communication and packet-switched communication according to (n+m) multiple TDMA communication mode whereby one frame consists of n slots for control channel, n being a natural number, and m slots for traffic channel, m being a natural number, comprising:

a packet-switched data processing means for storing a packet-switched data to input and output;

a packet-switched data separating means for directly outputting the packet-switched data from said packet-switched data processing means and a control signal in transmission, and for separating the packet-switched data and the control signal and outputting them to input-output terminals of said packet-switched data processing means and the control signal in reception;

a slot associating means, being connected with input-output terminals of said packet-switched data processing means and for circuit-switched data, for inputting and outputting calls to send and receive, and for associating TDMA slots with the calls to send and receive;

a time division processing means, being connected with said slot associating means and said packet-switched data separating means, for assembling and disassembling the TDMA slots and TDMA frames;

a radio sending and receiving means for sending and receiving the calls to be sent and received with the TDMA frame as a unit, which is connected with said time division processing means; and a control means for having said packet-switched data processing means output a packet-switched data which is stored therein to one of said packet-switched data separating means and said slot associating means by indicating a slot timing which can be used for packet switching corresponding to a timing of a slot for control channel of a frame wherein a control signal is not transmitted if the packet-switched data is generated when an idle slot does not exist among the slots for traffic channel, corresponding to a timing of an idle slot for traffic channel if an idle slot exists among the slots for traffic channel, and corresponding to a slot for control channel of a frame wherein a control signal is not transmitted if a circuit-switched data is generated when a slot timing has been indicated for packet-switched data corresponding to a timing of an idle slot for traffic channel and an idle slot does not exist among the slots for traffic channel, and moreover for indicating a radio frequency to be used to said radio sending and receiving means if a packet-switched data is generated, for transmitting the packet-switched data using an idle slot among slots for traffic channel if outputting the packet-switched data to said slot associating means, and for transmitting the packet-switched data using an idle slot among slots for control channel if outputting the packet-switched data to said packet-switched data separating means.

12. A radio terminal that receives a control signal being sent intermittently using a slot for control channel and implements circuit-switched communication and packet-switched communication according to (n+m) multiple TDMA communication mode whereby one frame consists of n slots for control channel, n being a natural number, and m slots for traffic channel, m being a natural number, comprising:

a packet-switched data processing means for storing a packet-switched data to input and output;

a packet-switched data separating means for directly outputting the packet-switched data from said packet-switched data processing means and a control signal in transmission, and for separating the packet-switched data and the control signal and outputting them to input-output terminals of said packet-switched data processing means and the control signal in reception;

a slot associating means, being connected with input-output terminals of said packet-switched data processing means and for circuit-switched data, for inputting and outputting calls to send and receive, and for associating TDMA slots with the calls to send and receive;

a time division processing means, being connected with said slot associating means and said packet-switched data separating means, for assembling and disassembling the TDMA slots and TDMA frames;

a radio sending and receiving means for sending and receiving the calls to be sent and received with the TDMA frame as a unit, which is connected with said time division processing means; and a control means, for having said packet-switched data processing means output a packet-switched data which is stored therein to one of said packet-switched data separating means and said slot associating means by indicating a slot timing which can be used for packet switching corresponding to a timing of a slot for control channel of a frame wherein a control signal is not transmitted if the packet-switched data is generated when a idle slot does not exist among the slots for traffic channel, corresponding to a timing of an idle slot for traffic channel if an idle slot exists among the slots for traffic channel, and corresponding to a slot for control channel of a frame wherein a control signal is not transmitted if a circuit-switched data is generated when a slot timing has been indicated for packet-switched data corresponding to a timing of an idle slot for traffic channel and an idle slot does not exist among the slots for traffic channel, and moreover for indicating a radio frequency to be used to said radio sending and receiving means if a packet-switched data is generated, for transmitting packet-switched data using an idle slot among slots for traffic channel if outputting the packet-switched data to said slot associating means, for transmitting packet-switched data using an idle slot among slots for control channel if outputting the packet-switched data to said packet-switched data separating means.

13. A system for data communication that implements circuit-switched communication and packet-switched communication, comprising:

a radio base station according to claim 11;

a radio terminal that receives a control signal being sent intermittently from said radio base station using a slot for control channel and implements circuit-switched communication and packet-switched communication according to said (n+m) multiple TDMA communication mode, comprising:

a packet-switched data processing means for storing a packet-switched data to input and output;

a packet-switched data separating means for directly outputting the packet-switched data from said packet-switched data processing means and a control signal in transmission, and for separating the packet-switched data and the control signal and outputting them to input-output terminals of said packet-switched data processing means and the control signal in reception;

a slot associating means, being connected with input-output terminals of said packet-switched data processing means and for circuit-switched data, for inputting and outputting calls to send and receive, and for associating TDMA slots with the calls to send and receive;

a time division processing means, being connected with said slot associating means and said packet-switched data separating means, for assembling and disassembling the TDMA slots and TDMA frames;

a radio sending and receiving means for sending and receiving the calls to be sent and received with the TDMA frame as a unit, which is connected with said time division processing means; and a control means for having said packet-switched data processing means output a packet-switched data which is stored therein to one of said packet-switched data separating means and said slot associating means by indicating a slot timing which can be used for packet switching corresponding to a timing of a slot for control channel of a frame wherein a control signal is not transmitted if the packet-switched data is generated when an idle slot does not exist among the slots for traffic channel, corresponding to a timing of an idle slot for traffic channel if an idle slot exists among the slots for traffic channel, and corresponding to a slot for control channel of a frame wherein a control signal is not transmitted if a circuit-switched data is generated when a slot timing has been indicated for packet-switched data corresponding to a timing of an idle slot for traffic channel and an idle slot does not exist among the slots for traffic channel, and moreover for indicating a radio frequency to be used to said radio sending and receiving means if a packet-switched data is generated, for transmitting packet-switched data using an idle slot among slots for traffic channel if outputting the packet-switched data to said slot associating means, and for transmitting packet-switched data using an idle slot among slots for control channel if outputting the packet-switched data to said packet-switched data separating means.

* * * * *

UNITED STATES PATENT AND TRADEMARK OFFICE
CERTIFICATE OF CORRECTION

PATENT NO. : 5,881,061
DATED : March 9, 1999
INVENTOR(S) : Masataka IIZUKA et al.

It is certified that error appears in the above-identified patent and that said Letters Patent is hereby corrected as shown below:

Title Page, Item [75], in the Inventors, line 1, after "Iizuka", insert --, Yokohama--; and after "Yoshida", insert --, Yokosuka--; and line 2, after "Kayama," delete "all of".

Claim 1, Col. 11, line 37, "of each slot" should read --among the slots--.

Claim 6, Col. 12, line 33, before "radio", delete "0537".

Claim 6, Col. 12, line 43, after "generated" (first occurrence), insert --,--.

Claim 12, Col. 15, line 26, "a idle" should read --an idle--.

Signed and Sealed this

Seventh Day of December, 1999

Attest:

Q. TODD DICKINSON

*Attesting Officer*  *Acting Commissioner of Patents and Trademarks*